(12) United States Patent
Mizutani et al.

(10) Patent No.: US 7,682,435 B2
(45) Date of Patent: Mar. 23, 2010

(54) OIL-BASED PIGMENTED INK COMPOSITION

(75) Inventors: Takuo Mizutani, Ibaraki (JP); Takahiro Furutani, Ibaraki (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 230 days.

(21) Appl. No.: 11/885,950

(22) PCT Filed: Feb. 17, 2006

(86) PCT No.: PCT/JP2006/302848

§ 371 (c)(1),
(2), (4) Date: Sep. 7, 2007

(87) PCT Pub. No.: WO2006/095556

PCT Pub. Date: Sep. 14, 2006

(65) Prior Publication Data

US 2009/0124731 A1   May 14, 2009

(30) Foreign Application Priority Data

Mar. 11, 2005 (JP) ............................. 2005-068484

(51) Int. Cl.
   *C09D 11/02* (2006.01)
(52) U.S. Cl. .............. 106/31.76; 106/31.77; 106/31.78; 106/31.86
(58) Field of Classification Search .............. 106/31.86, 106/31.76, 31.77, 31.78
See application file for complete search history.

(56) References Cited

U.S. PATENT DOCUMENTS

| | | | |
|---|---|---|---|
| 4,290,072 A | 9/1981 | Mansukhani | |
| 6,413,213 B1 | 7/2002 | Essenpreis et al. | |
| 6,786,956 B2 * | 9/2004 | Ichikawa | 106/31.86 |
| 7,014,698 B2 | 3/2006 | Mizutani et al. | |
| 7,132,013 B2 | 11/2006 | Mizutani et al. | |
| 7,132,014 B2 | 11/2006 | Mizutani et al. | |
| 7,393,884 B2 * | 7/2008 | Furutani et al. | 106/31.86 |
| 7,462,229 B2 * | 12/2008 | Ichikawa et al. | 106/31.86 |
| 2004/0236019 A1 | 11/2004 | Numrich et al. | |
| 2004/0254265 A1 | 12/2004 | Mizutani et al. | |
| 2005/0148688 A1 | 7/2005 | Mizutani et al. | |
| 2005/0148689 A1 | 7/2005 | Mizutani et al. | |
| 2006/0272547 A1 | 12/2006 | Mizutani et al. | |
| 2008/0097013 A1 * | 4/2008 | Mizutani | 524/107 |
| 2008/0234428 A1 * | 9/2008 | Furutani et al. | 524/599 |

FOREIGN PATENT DOCUMENTS

| | | |
|---|---|---|
| JP | 56-120776 A | 9/1981 |
| JP | 2002-241654 A | 8/2002 |
| JP | 2005-15672 A | 1/2005 |
| JP | 2005-23298 A | 1/2005 |
| JP | 2005-501161 A | 1/2005 |

OTHER PUBLICATIONS

Machine translation of JP 2002/241654, Aug. 2002.*

* cited by examiner

*Primary Examiner*—Helene Klemanski
(74) *Attorney, Agent, or Firm*—Birch, Stewart, Kolasch & Birch, LLP

(57) ABSTRACT

The present invention relates to an oil-based pigmented ink composition containing at least a pigment, a polymer compound and an organic solvent, which contains, as the organic solvent, methoxybutyl acetate in an amount of 20 to 90% by weight based on the entire ink composition; and particularly to the above oil-based pigmented ink composition, which contains, as the other organic solvent, a nitrogen-containing and/or oxygen-containing heterocyclic compound in an amount of 1 to 50% by weight based on the entire ink composition and/or a (poly)alkylene glycol derivative in an amount of 1 to 50% by weight based on the entire ink composition; and to the above oil-based pigmented ink composition, which has a flash point of 61° C. or higher, a viscosity of 2.0 to 6.5 cp at 25° C., and a surface tension of 20 to 40 mN/m at 25° C.

13 Claims, No Drawings

OIL-BASED PIGMENTED INK COMPOSITION

TECHNICAL FIELD

This application claims priority of Japanese Patent Application No. 2005-068484, the entire contents of which are herein incorporated by reference.

The present invention relates to an oil-based pigmented ink composition containing at least a pigment, a polymer compound and an organic solvent, particularly to an oil-based pigmented ink composition for ink-jet recording system.

BACKGROUND ART

In an ink-jet printing system, a liquid ink is ejected from a nozzle towards a recording medium using a pressure, heat or an electric field as a driving source to print the recording medium. The ink-jet printing system can be used with a low running cost and form high quality images. Furthermore, this printing system can use various inks such as aqueous and oil-based inks. Accordingly, the ink-jet printing system has been expanding its market.

Under such circumstances, large-size ink jet printers, which can be used to print a sheet of the A-0 size with aqueous pigmented inks, have been developed, and are used to output indoor posters, CAD drawings, or proofing for color matching in printing. The printed materials can be used outdoors with laminating them.

Furthermore, the demand for outdoor use of the ink-jet printed materials has been increased. Therefore, there have been developed oil-based pigmented inks, which can be printed directly on films of polyvinyl chloride (hereinafter abbreviated to PVC) and used outdoors without lamination, and have excellent water resistance and weatherability.

Since the oil-based pigmented inks contains organic solvents as solvents, they do not cause the cockling of a paper sheet in comparison with aqueous pigmented inks, or require no lamination of a film having a receptive layer. Therefore, they can be printed on a substrate at low cost.

For example, there are proposed an oil-based pigmented ink comprising a glycol-based solvent having a boiling point of 150° C. or higher and a specific polyester resin (see Japanese Unexamined Patent Publication (Kokai) No. 7-109430 (pages 3 to 5)) and an oil-based pigmented ink comprising a glycol-based solvent having a boiling point of 200° C. or higher and a specific resin (see Japanese Unexamined Patent Publication (Kokai) No. 2002-302629 (pages 4 to 6)). However, when only a glycol-based solvent having a boiling point of 150° C. or higher is used, or a solvent having a boiling point of 200° C. or higher is used, the obtained ink has low drying property and has a problem that printed characters or images tend to blur when the ink is printed on a PVC film.

Also, oil-based pigmented inks containing 3-methoxy-3-methyl-butyl acetate as a primary solvent are proposed (see Japanese Unexamined Patent Publication (Kokai) No. 2004-231870 (pages 2 to 3) and Japanese Unexamined Patent Publication (Kokai) No. 2004-262985 (pages 2 to 3)). However, when 3-methoxy-3-methyl-butyl acetate is used as the primary solvent, the obtained ink has increased viscosity and is likely to cause ejection failure when the ink is printed using a printer comprising a head having a small nozzle inside diameter.

DISCLOSURE OF THE INVENTION

In light of the above circumstance of the prior art, an object of the present invention is to realize an ink composition having low viscosity and high surface tension and to provide an oil-based pigmented ink composition which is excellent in ejection property in case of printing using an ink-jet printer and is excellent in drying property and fixing property in case of printing on a low cost printing medium such as a PVC film having no receptive layer, and also can endure outdoor environment.

The present inventions have intensively studied so as to achieve the above object and found that the use of methoxybutyl acetate as an organic solvent makes it possible to obtain an oil-based pigmented ink composition which is excellent in ejection property in case of printing using an ink-jet printer and can be printed with good drying property and fixing property on a printing medium such as a PVC film, particularly the oil-based pigmented ink composition suited for ink-jet recording systems, and thus the present invention has been completed.

Accordingly, the present invention provides an oil-based pigmented ink composition comprising at least a pigment, a polymer compound and an organic solvent, which contains, as the organic solvent, methoxybutyl acetate in an amount of 20 to 90% by weight based on the entire ink composition.

In particular, the present invention can provide the oil-based pigmented ink composition with the above constitution, which further contains, as the organic solvent, a heterocyclic compound in an amount of 1 to 50% by weight based on the entire ink composition; the oil-based pigmented ink composition with the above constitution, wherein the heterocyclic compound is a nitrogen-containing and/or oxygen-containing heterocyclic compound; the oil-based pigmented ink composition with the above constitution, which further contains, as the organic solvent, a (poly)alkylene glycol derivative in an amount of 1 to 50% by weight based on the entire ink composition; and the oil-based pigmented ink composition with the above constitution, wherein the (poly)alkylene glycol derivative is at least one compound selected from the group consisting of monoalkyl ether monoalkyl ester compounds, dialkyl ether compounds and dialkyl ester compounds of (poly)alkylene glycols.

Also, the present invention can provide the oil-based pigmented ink composition with the above constitution, which has a flash point of 61° C. or higher, a viscosity of 2.0 to 6.5 cp at 25° C., (more preferably from 3.0 to 6.0 cp, and particularly preferably from 3.5 to 5.5 cp) and a surface tension of 20 to 40 mN/m at 25° C.

As described above, according to the present invention, it is possible to improve ejection property in case of printing using an ink-jet printer, which has been considered as a problem in a conventional oil-based pigmented ink composition, by using methoxybutyl acetate as an organic solvent in an oil-based pigmented ink composition containing at least a pigment, a polymer compound and an organic solvent, and to provide an oil-based pigmented ink composition which can be printed with good drying property and fixing property on a PVC film having no ink receptive later, particularly an oil-based pigmented ink composition suited for ink-jet recording systems. Also, it has been found that danger to transportation or handling can be reduced by controlling a flash point of this ink composition to 61° C. or higher.

BEST MODE FOR CARRYING OUT THE INVENTION

The oil-based pigmented ink composition of the present invention is characterized by using methoxybutyl acetate as an organic solvent.

Methoxybutyl acetate includes 1-methoxybutyl acetate, 2-methoxybutyl acetate, 3-methoxybutyl acetate, and 4-methoxybutyl acetate. In general, 3-methoxybutyl acetate represented by the following formula (I) is cheap and is often used. However, by using 1-methoxybutyl acetate, 2-methoxybutyl acetate, and 4-methoxybutyl acetate as a solvent of the ink composition, the same effect as that of 3-methoxybutyl acetate can be exerted.

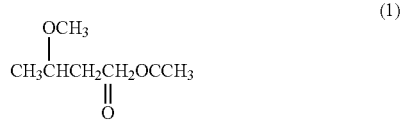
(1)

This methoxybutyl acetate is a solvent having low viscosity and excellent volatility. The use of methoxybutyl acetate as a primary solvent of an ink composition makes it possible to prepare an ink composition which has low viscosity and high surface tension, and is also excellent in ejection stability of droplets in case of printing using an ink-jet printer. Also, since this solvent has low viscosity, the other solvent serving as a co-solvent used to prepare an ink can be widely selected and it becomes easy to appropriately adjust the composition of the solvent according to a printer and a substrate to be printed. Furthermore, an amount of a resin in the ink composition can be increased by decreasing viscosity of the ink and also it becomes possible to improve water resistance, weatherability and abrasion resistance of a printed material.

Such the methoxybutyl acetate is preferably used in an amount within a range from 20 to 90% by weight, and particularly preferably from 30 to 80% by weight, based on the entire ink composition. When the amount is less than 20% by weight, it is difficult to obtain the above effect. When the amount is more than 90% by weight, a relative amount of a pigment or a polymer compound decreases and it is difficult to obtain good results in ink characteristics such as printability, pigment dispersibility, and durability (fixing property) of a printed material.

As described hereinafter, this methoxybutyl acetate is preferably used in combination with the other organic solvent as an organic solvent. In this case, the amount of the methoxybutyl acetate is preferably controlled to 30% by weight or more, and particularly preferably 40% by weight or more, based on the entire organic solvent so as to exert the above effect.

In the present invention, it is preferred to further improve fixing property by using the methoxybutyl acetate in combination with a solvent which dissolves a resin such as PVC, thereby fixing a pigment.

Examples of the solvent capable of dissolving the resin such as PVC include ketone-based compounds such as acetone, methyl ethyl ketone, and cyclohexanone; oxygen-containing heterocyclic compounds such as tetrahydrofuran and tetrahydropyran; and nitrogen-containing heterocyclic compounds such as N-alkyl-2-pyrrolidone.

Among these solvents, ketone-based compounds and tetrahydrofuran are excellent in a power of dissolving PVC. However, acetone, methyl ethyl ketone, methyl isobutyl ketone, methyl n-butyl ketone, cyclohexanone, methylcyclohexanone and tetrahydrofuran are designated in the Industrial Safety and Health Law. A material containing 5% by weight or more of one of them can be handled by a person having a special qualification, and a person who handles such a material should get a medical checkup. Therefore, handling of those solvents is troublesome.

Among the ketone compounds and tetrahydrofuran derivatives other than the above compounds, ketones and tetrahydrofuran derivatives having a low molecular weight may well dissolve PVC, but many of them have a low flash point so that it is highly possible that ink compositions comprising such solvents have a flash point of lower than 61° C. and their storage and transportation are sometimes restricted. Furthermore, since these solvents have strong odor, the ink composition containing only a slight amount of the solvent may emit odors. Ketones and tetrahydrofuran derivatives having a high molecular weight have a high flash point and low odor. However, such solvents less dissolve PVC and thus the pigments in the ink composition may not be sufficiently fixed to the substrate.

The nitrogen-containing heterocyclic compounds are heterocyclic compounds having at least one nitrogen atom as one of constituent elements, and most of them do not violate the regulation for preventing poisoning with organic solvents in the Industrial Safety and Health Law as described above. Therefore, they are highly safe, and emit less odor, and are particularly preferable when used in an ink.

That is, the nitrogen-containing heterocyclic compounds have much better properties as organic solvents of the ink compositions than ketone-based compounds. Among the nitrogen-containing heterocyclic compounds, heterocyclic compounds having a lactam structure such as 2-pyrrolidone and N-alkyl-2-pyrrolidone are preferable because they have a high flash point and low odor and are excellent in property capable of dissolving PVC.

Examples of N-alkyl-2-pyrrolidone include N-methyl-2-pyrrolidone, N-ethyl-2-pyrrolidone, N-(2-hydroxyethyl)-2-pyrrolidone, N-cyclohexyl-2-pyrrolidone, N-octyl-2-pyrrolidone, N-dodecyl-2-pyrrolidone, and N-vinyl-2-pyrrolidone.

Among them, 2-pyrrolidone, N-methyl-2-pyrrolidone and N-ethyl-2-pyrrolidone are particularly preferable because they have low viscosity and low odor and are excellent in property capable of dissolving PVC, and also have good biodegradability and are excellent in view of safety because of low acute toxicity.

The oxygen-containing heterocyclic compounds typified by tetrahydrofuran and tetrahydropyran are excellent in property capable of dissolving PVC, but many of them have odor. When used as the solvent of the ink composition, it is necessary to avoid damaging features of the ink by sufficiently paying attention to a flash point, a boiling point and odor. Some of tetrahydrofuran derivatives and tetrahydropyran derivatives can be used as the solvent of the ink composition by replacing the substituent thereby increasing a boiling point and a flash point.

Among the oxygen-containing heterocyclic compounds, compounds having a lactone structure such as 2-acetylbutyrolactone, γ-butyrolactone, δ-lactone and ε-caprolactone are particularly preferable as the solvent of the ink composition in view of safety because may of them emit less odor.

As described above, in the present invention, fixing property can be enhanced by using compounds having excellent characteristics such as low viscosity, low odor and property capable of dissolving PVC, which are selected from among heterocyclic compounds composed of oxygen-containing and/or nitrogen-containing heterocycles.

That is, by using, as the solvent of the ink composition in the oil-based pigmented ink composition of the present invention, the above specific heterocyclic compounds in combination with the above methoxybutyl acetate, fixing property of a printed material, for example, water resistance and scratch resistance can be improved.

An amount of the nitrogen-containing heterocyclic compound is preferably controlled within a range from 1 to 50% by weight, preferably from 5 to 35% by weight, and more preferably from 10 to 25% by weight, based on the entire ink composition. When the amount of the nitrogen-containing heterocyclic compound is less than 1% by weight, the ink composition may not sufficiently dissolve PVC. When the amount of the nitrogen-containing heterocyclic compound is more than 50% by weight, the effect of dissolving PVC may be saturated, and the volatility of the ink composition becomes insufficient so that printed characters or images tend to drip or blur.

To qualitatively and quantitatively analyze the nitrogen-containing heterocyclic compound in the oil-based pigmented ink composition of the present invention, gas chromatography is effectively used.

In the present invention, by using in combination with a (poly)alkylene glycol derivative, in addition to the above methoxybutyl acetate and heterocyclic compound, the viscosity, the surface tension and the flash point of the ink can be adjusted and thus it becomes possible to easily control ejection stability in case of printing using a printer, printing adaptability to a substrate, and safety of the ink.

In the present invention, the (poly)alkylene glycol derivative means an alkylene glycol derivative and/or a polyalkylene glycol derivative.

The (poly)alkylene glycol derivative has a polar group (for example, an ester group and an ether group) and a hydrophobic group (for example, an alkyl group) in the molecule. Therefore, when the methoxybutyl acetate and the heterocyclic compound are used in combination, it is possible to formulate an ink composition which exhibits good fixing properties and water resistance not only on the PVC substrate but also any other printing medium such as a plain paper, a matte paper, and a glossy paper. The odor and the flash point of the ink composition can be easily controlled by selecting the number of the ester and ether groups and the number of carbon atoms in the alkyl group.

In view of the safety and odor of the ink composition, the (poly)alkylene glycol derivative preferably has a flash point within a range from 50 to 120° C., and more preferably from 60 to 100° C., and preferably has a boiling point within a range from 150 to 250° C.

When the (poly)alkylene glycol derivative is used in combination with the nitrogen-containing heterocyclic compound, the flash point of the entire ink composition can be easily set to 61° C. or higher so that the obtained ink composition has very high safety with regard to the ignition during transportation of the ink composition.

Examples of the (poly)alkylene glycol derivative include compounds having one free hydroxyl group such as a monoalkyl ether or a monoalkyl ester of a (poly)alkylene glycol, and compounds having no free hydroxyl group such as a monoalkyl ether monoalkyl ester, a dialkyl ether or a dialkyl ester of a (poly)alkylene glycol.

Among them, the compounds having no hydroxyl group such as the monoalkyl ether monoalkyl ester, the dialkyl ether and the dialkyl ester are preferable since they can decrease the viscosity of the ink composition and improve the water resistance of the ink composition. Among the alkyl esters compounds, those having a methyl ester group are preferable.

Examples of the monoalkyl ether monoalkyl ester of a (poly)alkylene glycol include ethylene glycol monoalkyl ether monoalkyl ester, diethylene glycol monoalkyl ether monoalkyl ester, triethylene glycol monoalkyl ether monoalkyl ester, propylene glycol monoalkyl ether monoalkyl ester, dipropylene glycol monoalkyl ether monoalkyl ester, and tripropylene glycol monoalkyl ether monoalkyl ester.

Among them, mono- or dialkylene glycol monoalkyl ether monoalkyl ester is preferable because it has a larger molecular weight, a higher flash point and boiling point, and lower odor than trialkylene glycol monoalkyl ether monoalkyl ester.

In particular, ethylene glycol monoalkyl ether monoalkyl ester, diethylene glycol monoalkyl ether monoalkyl ester, propylene glycol monoalkyl ether monoalkyl ester and dipropylene glycol monoalkyl ether monoalkyl ester are preferably used alone or in combination.

Since these compounds have a moderate molecular weight, they have the safety and prevent the clogging of nozzles due to the drying of the ink composition at the same time. They have no unpleasant odor and therefore the ink composition comprising such solvents has no unpleasant odor.

Examples of the compound include ethylene glycol monobutyl ether monomethyl ester, diethylene glycol monoethyl ether monomethyl ester, diethylene glycol monobutyl ether monomethyl ester, dipropylene glycol monomethyl ether monomethyl ester, and dipropylene glycol monoethyl ether monomethyl ester.

These compounds are preferably used because they have particularly low viscosity. In particular, ethylene glycol monobutyl ether monomethyl ester and dipropylene glycol monomethyl ether monomethyl ester are preferable as the solvent of the ink composition because it has a high flash point and low odor.

Examples of the dialkyl ether compound of the (poly)alkylene glycol include ethylene glycol dialkyl ether, diethylene glycol dialkyl ether, triethylene glycol dialkyl ether, propylene glycol dialkyl ether, dipropylene glycol dialkyl ether, and tripropylene glycol dialkyl ether. These compounds are preferably used alone or in combination.

Examples of such a compound include ethylene glycol dibutyl ether, diethylene glycol dimethyl ether, diethylene glycol diethyl ether, diethylene glycol dibutyl ether, propylene glycol dimethyl ether, propylene glycol diethyl ether, propylene glycol dibutyl ether, dipropylene glycol dimethyl ether, and dipropylene glycol diethyl ether. These compounds are preferably used because they have particularly low odor.

In particular, dipropylene glycol dialkyl ether and diethylene glycol diethyl ether are preferably used as the solvent of the ink composition because they have comparatively low odor and a low viscosity.

Furthermore, examples of the dialkyl ester compound of the (poly)alkylene glycol include ethylene glycol dialkyl ester, diethylene glycol dialkyl ester, triethylene glycol dialkyl ester, propylene glycol dialkyl ester, dipropylene glycol dialkyl ester, and tripropylene glycol dialkyl ester. These compounds are preferably used alone or in combination.

As the dialkyl ester compound of the (poly)alkylene glycol, ethylene glycol dimethyl ester, diethylene glycol dimethyl ester, propylene glycol dimethyl ester, and dipropylene glycol dimethyl ester are preferably used because they have low odor.

Among them, propylene glycol dimethyl ester is preferably used as the solvent of the ink composition because it has comparatively low odor and a low viscosity.

In the present invention, the (poly)alkylene glycol derivatives may be used alone or in combination. One or more (poly)alkylene glycol derivatives are used in the ink composition in an amount within a range from 1 to 50% by weight, preferably from 5 to 45% by weight, and more preferably from 10 to 40% by weight.

To qualitatively and quantitatively analyze the (poly)alkylene glycol derivative in the oil-based pigmented ink composition of the present invention, gas chromatography is effectively used.

In the present invention, a (poly)alkylene glycol derivative having a flash point of lower than 60° C. may be used. Such a (poly)alkylene glycol derivative is used in combination with the other (poly)alkylene glycol derivative in an amount such that the entire ink composition as a whole has a flash point of 61° C. or higher.

For example, when a (poly)alkylene glycol derivative having a flash point of 50 to 60° C., it is used in an amount of 35% by weight or less, and preferably 30% by weight or less, based on the entire ink composition.

In the present invention, the methoxybutyl acetate is used in combination with a heterocyclic compound and the (poly) alkylene glycol derivative as an organic solvent, and it is also possible to optionally use in combination with common organic solvents such as alcohol-based compounds, ketone-based compounds, ester-based compounds, amine-based compounds, glycol-based compounds, glycol ether-based compounds, aromatic-based compounds. The kind and amount of such an optional organic solvent should be selected so that the characteristic properties of the ink composition of the present invention are not impaired.

In particular, when ketone-based compounds, ester-based compounds aromatic compounds are added, a solvent having a boiling point of 150° C. or higher and a flash point of at least 70° C. or higher is preferably used. Since an organic solvent having a boiling point lower than 150° C. emits odor, its amount is preferably less than 5% by weight, more preferably less than 1% by weight, and most preferably less than 0.5% by weight, based on the entire ink composition.

In the oil-based pigmented ink composition of the present invention, a pigment is used as a coloring material in view of light resistance and includes an inorganic pigment and an organic pigment.

These inorganic and organic pigments are used in an appropriate amount according to the kind as well as uses and purposes of the ink composition. These inorganic and organic pigments may be preferably used in the ink composition in an amount within a range from 0.1 to 10% by weight, and particularly preferably from 0.3 to 6% by weight.

To improve dispersibility of the pigment, an appropriate pigment derivative may be used in combination. For example, a pigment derivative having a dialkylaminomethyl group and a pigment derivative having a dialkylaminoethylsulfonic acid amide group are preferably used.

As a commercially available pigment derivative, "EFKA6745" and "EFKA6750" manufactured by EFKA additives; and "SOLSPERSE5000" and "SOLSPERSE22000" manufactured by Lubrizol Co. are preferably used.

Examples of the inorganic pigment, which can be used in the present invention, include titanium oxide, zinc white, zinc oxide, Tripon, iron oxide, aluminum oxide, silicon dioxide, kaolinite, montmorillonite, talc, barium sulfate, calcium carbonate, silica, alumina, cadmium red, red iron oxide, molybdate red, chrome vermilion, molybdate orange, lead yellow, chrome yellow, cadmium yellow, yellow iron oxide, titanium yellow, chromium oxide, viridian, cobalt green, titanium cobalt green, cobalt chrome green, permanent blue, ultramarine blue, Prussian blue, cobalt blue, cerulean blue, manganese violet, cobalt violet, and mica.

Examples of the organic pigment, which can be used in the present invention, include azo-based, azomethine-based, polyazo-based, phthalocyanine-based, quinacridon-based, anthraquinone-based, indigo-based, thioindigo-based, quinophthalone-based, benzimidazolone-based, isoindoline-based, and isoindolinone-based pigments.

Also, carbon black comprising acidic, neutral or basic carbon may be used as the organic pigment used in the present invention. Furthermore, hollow particles of a crosslinked acryl resin can also be used as the organic pigment.

Examples of the pigment in a cyan ink composition include C.I. Pigment Blue 1, 2, 3, 15:3, 15:4, 15:34, 16, 22 and 60. In particular, C.I. Pigment Blue 15:3 and 15:4 are preferably used alone or in combination in view of good weatherability and coloring power.

Examples of the pigment in a magenta ink composition include C.I. Pigment Red 5, 7, 12, 48(Ca), 48(Mn), 57(Ca), 57:1, 112, 122, 123, 168, 184, 202, 209 and 254, and C.I. Pigment Violet 19. In particular, C.I. Pigment Red 122, 202, 209 and 254, and C.I. Pigment Violet 19 are preferably used alone or in combination in view of good weatherability and coloring power.

Examples of the pigment in a yellow ink composition include C.I. Pigment Yellow 1, 2, 3, 12, 13, 14C, 16, 17, 73, 74, 75, 83, 93, 95, 97, 98, 109, 110, 114, 120, 128, 129, 130, 138, 139, 147, 150, 151, 154, 155, 180, 185, 213 and 214. In particular, C.I. Pigment Yellow 74, 83, 97, 109, 110, 120, 128, 138, 139, 150, 151, 154, 155, 213 and 214 are preferably used alone or in combination in view of good weatherability and coloring power.

Examples of the pigment in a black ink composition include HCF, MCF, RCF, LFF and SCF manufactured by Mitsubishi Chemical Corporation; Monarch and Regal manufactured by Cabot Corp.; Color Black, Special Black, and Printex manufactured by Degussa Huels AG; TOKABLACK manufactured by Tokai Carbon Co., Ltd; and Raven manufactured by Corombia Co.

In particular, HCF #2650, #2600, #2350 and #2300, MCF #1000, #980, #970 and #960, MCF 88, LFFMA 7, MA 8, MA 11, MA 77 and MA 100 manufactured by Mitsubishi Chemical Co., Ltd., and PRINTEX 95, 85, 75, 55 and 45 manufactured by Degussa Huls AG are preferably used alone or in combination.

In the oil-based pigmented ink composition of the present invention, a polymer compound is used as a pigment dispersant and/or a fixing resin. The pigment dispersant has good affinity with the pigment and stabilizes the dispersion of the pigment. The fixing resin has good adhesion to a substrate and imparts durability to the printed material.

When the pigment dispersant and/or the fixing resin are appropriately selected depending on the kinds of the pigment, organic solvents and printing medium, the ink composition exerts good effects. Among the polymer compounds, a single polymer compound may act as a pigment dispersant and a fixing resin.

The polymer compound preferably has solubility in water and ethanol of less than 3% by weight, and more preferably less than 1% by weight.

The pigment dispersant and the fixing resin remain on the surface of the substrate after printing with the ink-jet printing system and then they are dried and fixed to the substrate. Therefore, if the polymer is easily soluble in water, the printed material has less water resistance so that the printed characters and/or images are washed off with rain, when the printed material is used outdoors. When the printed material is used in the form of a poster, a coating agent is often sprayed on the printed surface. Since the coating agent usually contains an alcohol component as a primary solvent, the printed characters and images are sagged with the coating agent if the polymer compounds are easily soluble in the alcohol solvent.

In contrast, the polymer compounds having the solubility in water and ethanol in the above range do not cause such problems.

As the pigment dispersant, an ionic or nonionic surfactant, or an anionic, cationic or nonionic polymer is used. In view of dispersion stability, water resistance, scratch resistance and strength of the printed material, the polymer compound, in particular, a polymer compound having a cationic group or an anionic group is preferable. A polymer compound having a cationic group capable of easily obtaining the effect of improving steric repellence of preventing reaggregation of the pigment is most preferable.

The pigment dispersant stabilizes the pigment in the organic solvent through an acid-base interaction between the pigment and the dispersant. Thus, the pigment dispersant should have at least one of a cationic group and an anionic group, which function as pigment-absorbing sites, and the kind and amount of the cationic group and the anionic group of the dispersant are selected depending on the kind of the pigment.

Examples of the pigment dispersant as the polymer compound include SOLSPERSE manufactured by Zeneca, DISPER BYK manufactured by BYK-Chemie, EFKA manufactured by EFKA Additives and AJISPER manufactured by Ajinomoto-Fine-Techno Co., Inc. Among them, DISPER BYK 161, 162, 163, 167 and 168, EFKA 4047, 4050, 4055 4060, and SOLSPERSE 20000, 32000, 32500, 32550, 35100, 31845, 34750 and 38500 are more preferable. When these pigment dispersants are selected and used according to the kinds of the pigment and solvents, the ink composition can often exert good effects.

The pigment dispersants are usually commercially available in the form of solutions. In such a case, the solution contains a low-boiling solvent such as toluene, xylene, ethyl acetate, butyl acetate, and methyl ethyl ketone. When the solution is used as such in the preparation of the ink composition, the ink composition may have odor originated from such a solvent.

Therefore, the low-boiling solvent is removed from the solution of the pigment dispersant, if necessary, when the solvents may have adverse affects on the properties of the ink composition, for example, odor and safety. The low-boiling solvent can be removed by vacuum distillation or reprecipitation.

By such removal methods, the content of the low-boiling solvent in the dispersant solution, in particular, a solvent having a boiling point of 170° C. or lower, is decreased to 5% by weight or less, preferably 1% by weight or less, and more preferably 0.5% by weight or less of the dispersant solution. Thereby, the odor of the ink composition can be controlled.

As the fixing resin, at least one resin selected from the group consisting of polyester-based resins, polyurethane-based resins and vinyl chloride-based resins is preferably used. Most of these resins have good fixing properties to PVC. Water resistance, dispersion stability and printing properties can be controlled by selecting the functional groups and structures of the resins.

Examples of the polyester-based resin include ELITEL manufactured by UNITIKA Co., Ltd. and VYLON® manufactured by Toyobo Co., Ltd.

Examples of the polyurethane-based resin include VYLON® UR manufactured by Toyobo Co., Ltd., NT-Hi-Lamic manufactured by Dainichi Seika Color & Chemicals Mfg. Co., Ltd., CRISVON® manufactured by Dainippon Ink and Chemicals Incorporated, and NIPPORAN manufactured by Nippon Polyurethane Industry Co., Ltd.

Examples of the vinyl chloride-based resin include SOLBIN manufactured by Nissin Chemical Industries, Ltd., SEKISUI PVC-TG and SEKISUI PVC-HA manufactured by Sekisui Chemical Co., Ltd., and UCAR Series manufactured by DOW CHEMICAL.

The fixing resin preferably has a weight average molecular weight within a range from 2,000 to 100,000, more preferably from 5,000 to 80,000, and most preferably from 10,000 to 50,000.

When the weight average molecular weight of the fixing resin is less than 2,000, the effect of steric repellence may not be achieved and the effect of enhancing fixation between a medium and pigment particles is not easily obtained, and thus the film strength may not be sufficiently attained. When the weight average molecular weight of the fixing resin is more than 100,000, the effects of the use of the fixing resin is saturated and also the viscosity of the ink composition increases so that the ink composition may not have sufficient flowability.

Herein, the weight average molecular weight means a molecular weight of the resin measured by gel permeation chromatography and calibrated with standard samples of polystyrene.

When the pigment dispersant composed of the polymer compound is used, the amount of the pigment dispersant may depend on the kinds of the pigment and solvent, and is usually from 10 to 150% by weight.

When the polymeric fixing resin composed of the polymer compound is used, the amount of the fixing resin may depend on the kind and molecular weight of the resin, the kinds of the pigment and solvents, and is usually from 5 to 200% by weight based on the weight of the pigment.

The oil-based pigmented ink composition of the present invention can be prepared by any conventional method. For example, a pigment, a polymer compound (pigment dispersant) and methoxybutyl acetate as a part of an organic solvent are premixed and dispersed. Then, to the dispersion, the polymer compound (fixing resin), methoxybutyl acetate, a (poly) alkylene glycol derivative and a heterocyclic compound are added and mixed to disperse the pigment and the polymers in the solvent.

To prepare the above dispersion, the above respective components are well stirred and mixed using a barrel-driving type mills such as ball mill, centrifugal mill and planetary mill, high-speed rotation mills such as sand mill, medium-agitation mills such as agitated vessel mill, and simple dispersing equipment such as disper.

After the formation of the dispersion, the dispersion may additionally be uniformly mixed with a simple stirrer such as a three-one motor, a magnetic stirrer, a disper or a homogenizer. Furthermore, to reduce the particle size of the solid components, the dispersion may optionally be mixed with a dispersing equipment such as a bead mill or a high pressure jet mill.

Besides the pigment, polymers and organic solvents, the oil-based pigmented ink composition of the present invention may optionally contain conventionally used additives such as surfactants, surface-modifiers, leveling agents, defoaming agents, antioxidants, pH regulators, charging agents; disinfectants, preservatives, deodorants, charge-adjusters, wetting agents, anti-skinning agents, UV-ray absorbers, perfumes, and pigment derivatives.

The oil-based pigmented ink of the present invention, in particular, one for ink-jet printing systems, preferably has a surface tension within a range from 20 to 40 mN/m at 25° C., and more preferably from 25 to 35 mN/m.

When the surface tension is less than 20 mN/m, since wettability of the ink to the head excessively enhances, curving of track of an ink drop and dot blank may be likely to occur. Also, since wettability to the substrate excessively enhances, the printed characters or images are likely to blurred. When the surface tension is more than 40 mN/m, wettability to the substrate deteriorates, and thus the distance between dots excessively decreases in case of printing and the resulting image may be likely to be provided with a sense of graininess.

The oil-based pigmented ink of the present invention preferably has a viscosity within a range from 2.0 to 6.5 cp at 25° C., more preferably from 3.0 to 6.0 cp, and more preferably from 3.5 to 5.5 cp.

When the viscosity is less than 2.0 cp, ejection of the ink becomes unstable and thus disturbance in images is likely to be caused by splash. When the viscosity is more than 6.5 cp, when using a printer head having a small nozzle inside diameter, ink droplets cannot be formed and thus ejection failure may occur.

Furthermore, in the oil-based pigmented ink composition of the present invention, the pigment preferably has a dispersion average particle size within a range from 20 to 250 nm, and more preferably 50 to 160 nm. When the dispersion average particle size is less than 20 nm, the particles are too small so that the printed material may lose light resistance. When the dispersion average particle size is more than 250 nm, the fineness of the printed material may deteriorate.

Preferred oil-based pigmented composition of the present invention is characterized in that a flash point of the entire ink composition is controlled to 61° C. or higher by using the above organic solvents. When the flash point is lower than 61° C., the oil-based pigmented composition is classified into a high flash point flammable liquid in dangerous materials in case of transportation by sea-vessels in international laws and regulations relating to transportation. Therefore, it becomes difficult to handle and also there is a danger of ignition in case of a trouble such as leak. All of these problems can be avoided by controlling the flash point of the oil-based pigmented composition to 61° C. or higher.

With the oil-based pigmented ink composition of the present invention, the surface tension and viscosity at 25° C. and the dispersion average particle size and maximum dispersion particle size of the pigment can be adjusted in the above respective ranges by suitably selecting the kinds and amounts of the components of the ink composition, since the above methoxybutyl acetate is used as the organic solvent.

The oil-based pigmented ink composition of the present invention has low odor and high safety, is printable on various printing media such as an inexpensive film of PVC having no receptive layer and can endure the outdoor use conditions. Furthermore, the oil-based pigmented ink composition of the present invention is advantageously used in the ink-jet printing systems. In such systems, the four or more ink compositions including the cyan, magenta, yellow and black ink compositions can be used at the same time to form images.

Main aspects and preferred embodiments of the present invention will now be listed.

[1] An oil-based pigmented ink composition comprising at least a pigment, a polymer compound and an organic solvent, which contains, as the organic solvent, methoxybutyl acetate in an amount of 20 to 90% by weight based on the entire ink composition.

[2] The oil-based pigmented ink composition according to the above paragraph [1], which further contains, as the organic solvent, a heterocyclic compound in an amount of 1 to 50% by weight based on the entire ink composition.

[3] The oil-based pigmented ink composition according to the above paragraph [2], wherein the heterocyclic compound is a nitrogen-containing and/or oxygen-containing heterocyclic compound.

[4] The oil-based pigmented ink composition according to any one of the above paragraphs [1] to [3], which further contains, as the organic solvent, a (poly)alkylene glycol derivative in an amount of 1 to 50% by weight based on the entire ink composition.

[5] The oil-based pigmented ink composition according to the above paragraph [4], wherein the (poly)alkylene glycol derivative is at least one compound selected from the group consisting of monoalkyl ether monoalkyl ester compounds, dialkyl ether compounds and dialkyl ester compounds of (poly)alkylene glycols.

[6] The oil-based pigmented ink composition according to any one of the above paragraphs [1] to [5], which has a flash point of 61° C. or higher, a viscosity of 2.0 to 6.5 cp at 25° C., and a surface tension of 20 to 40 mN/m at 25° C.

[7] The oil-based pigmented ink composition according to the above paragraph [6], which has a viscosity of 3.0 to 6.0 cp at 25° C.

[8] The oil-based pigmented ink composition according to the above paragraph [6], which has a viscosity of 3.5 to 5.5 cp at 25° C.

The present invention will now be described in detail by way of Examples. The present invention disclosed above is not limited to the following Examples as long as it is within a technical scope without departing from the spirit of the invention. A person with an ordinary skilled in the art can easily employ known modifications and conditions based on the following description.

In the Examples, parts are by weight unless otherwise indicated. In the Examples, methoxybutyl acetate used is manufactured by Daicel Chemical Industries, Ltd. (flash point: 62.5° C., boiling point: 171° C.).

In the Examples, pigment dispersants "BYK161", "SOLSPERSE32550", and "EFKA4060", and a fixing resin "VYLON® UR-8300" were used after removing low boiling solvents by vacuum distillation and then diluting them with organic solvents to be used in a dispersing step to a solid content of 20% by weight.

In the Examples, the amounts of pigment dispersants "BYK 161", "SOLSPERSE 13940", "SOLSPERSE32550", and "EFKA4060", and a fixing resin "VYLON® UR 8300" are expressed in terms of weights after being diluted with organic solvents.

EXAMPLE 1

In a 100 cc plastic bottle, 4 parts of a copper phthalocyanine blue pigment ("FASTOGEN BLUE 5430SD" manufactured by Dainippon Ink and Chemicals Incorporated) as a pigment, 10 parts of an amine-based polymeric dispersant ("SOLSPERSE32550" manufactured by LUBRIZOL Co.) as a pigment dispersant, 6 parts of methoxybutyl acetate and 100 parts of zirconia beads having a diameter of 0.3 mm were weighed and charged, and then dispersed using a paint conditioner (manufactured by TOYO SEIKI KOGYO Co., Ltd.) for one hour.

To 7.5 parts of the dispersion thus obtained, 1.2 parts of a vinyl chloride-vinyl acetate copolymer resin ("SOLBIN C5", weight average molecular weight: 26,000, manufactured by Nissin Chemical Industry Co., Ltd.), 10 parts of N-methyl-2-pyrrolidone, 21.3 parts of methoxybutyl acetate and 10 parts of dipropylene glycol dimethyl ether (manufactured by Dow Chemical; flash point: 60° C., boiling point: 175° C.) were added, and the mixture was stirred using a magnetic stirrer for 60 minutes. Thereafter, the mixture was suction filtrated through a glass filter (manufactured by KIRIYAMA GLASS WORKS Co., Ltd.) to obtain an oil-based pigmented ink composition A.

EXAMPLE 2

In a 100 cc plastic bottle, 4.5 parts of a quinacridon pigment ("CHROMOFINE RED 6107" manufactured by Dainichiseika Color & Chemicals Mfg. Co., Ltd.) as a pigment, 18 parts of a pigment dispersant ("SOLSPERSE32550"), 7.5 parts of methoxybutyl acetate and 100 parts of zirconia beads having a diameter of 0.3 mm were weighed and charged, and then dispersed using a paint conditioner for 3 hours.

To 10 parts of the dispersion thus obtained, 1 part of a vinyl chloride-vinyl acetate copolymer resin "SOLBIN CL", weight average molecular weight: 25,000, manufactured by Nissin Chemical Industry Co., Ltd.), 7.5 parts of N-methyl-2-pyrrolidone, 19 parts of methoxybutyl acetate and 12.5 parts of dipropylene glycol dimethyl ether were added, and the mixture was stirred using a magnetic stirrer for 60 minutes. Thereafter, the mixture was suction filtrated through a glass filter to obtain an oil-based pigmented ink composition B.

EXAMPLE 3

In a 100 cc plastic bottle, 4 parts of a nickel complex pigment ("YELLOW PIGMENT E4GN-GT" manufactured by Bayer Co.) as a pigment, 12 parts of a pigment dispersant ("SOLSPERSE32550"), 4 parts of methoxybutyl acetate and 100 parts of zirconia beads having a diameter of 0.3 mm were weighed and charged, and then dispersed using a paint conditioner for 2 hours.

To 7.5 parts of the dispersion thus obtained, 1.2 parts of a vinyl chloride-vinyl acetate copolymer resin "VROH", weight average molecular weight: 15,000, manufactured by The Dow Chemical Company), 10 parts of N-methyl-2-pyrrolidone, 19.3 parts of methoxybutyl acetate and 12 parts of dipropylene glycol dimethyl ether were added, and the mixture was stirred using a magnetic stirrer for 60 minutes. Thereafter, the mixture was suction filtrated through a glass filter to obtain an oil-based pigmented ink composition C.

EXAMPLE 4

In a 100 cc plastic bottle, 4 parts of an acidic carbon black pigment ("MA8", manufactured by Mitsubishi Chemical Corporation) as a pigment, 7 parts of an amine-based polymer dispersant ("BYK168" manufactured by BIGCHEMIE Co.) as a pigment dispersant, 9 parts of methoxybutyl acetate and 100 parts of zirconia beads having a diameter of 0.3 mm were weighed and charged, and then dispersed using a paint conditioner for 2 hours.

To 8.5 parts of the dispersion thus obtained, 1 part of a vinyl chloride-vinyl acetate copolymer resin "VYHD", weight average molecular weight: 22,000, manufactured by The Dow Chemical Company), 10 parts of N-methyl-2-pyrrolidone, 18.5 parts of methoxybutyl acetate and 12 parts of dipropylene glycol dimethyl ether were added, and the mixture was stirred using a magnetic stirrer for 60 minutes. Thereafter, the mixture was suction filtrated through a glass filter to obtain an oil-based pigmented ink composition D.

EXAMPLE 5

To 7.5 parts of the dispersion obtained in Example 1, 3.8 parts of a polyurethane resin ("VYLON® UR8300", average molecular weight: 30,000, manufactured by Toyobo Co., Ltd.), 7.5 parts of N-ethyl-2-pyrrolidone (manufactured by ISP Co., flash point: 93° C., boiling point: 204° C.), 6.2 parts of methoxybutyl acetate, 15 parts of dipropylene glycol monomethyl ether monomethyl ester (manufactured by The Dow Chemical Company, flash point: 96° C., boiling point: 209° C.) and 10 parts of dipropylene glycol dimethyl ether were added, and the mixture was stirred using a magnetic stirrer for 60 minutes. Thereafter, the mixture was suction filtrated through a glass filter to obtain an oil-based pigmented ink composition E.

EXAMPLE 6

To 7.5 parts of the dispersion obtained in Example 1, 3 parts of a polyester resin ("Elitel UE-9800", average molecular weight: 13,000, manufactured by UNITIKA, LTD.), 10 parts of γ-butyrolactone (manufactured by ISP, flash point: 93° C., boiling point: 204° C.), 14.5 parts of methoxybutyl acetate and 15 parts of ethylene glycol monobutylether acetate (manufactured by KYOWA HAKKO KOGYO Co., Ltd., flash point: 87.5° C., boiling point: 192° C.) were added, and the mixture was stirred using a magnetic stirrer for 60 minutes. Thereafter, the mixture was suction filtrated through a glass filter to obtain an oil-based pigmented ink composition F.

EXAMPLE 7

To 7.5 parts of the dispersion obtained in Example 1, 1 part of "SOLBIN CL" (used in Example 2), 12.5 parts of γ-butyrolactone and 29 parts of methoxybutyl acetate were added, and the mixture was stirred using a magnetic stirrer for 60 minutes. Thereafter, the mixture was suction filtrated through a glass filter to obtain an oil-based pigmented ink composition G.

EXAMPLE 8

In a 100 cc plastic bottle, 4.5 parts of a quinacridon pigment ("CINQUASIA MAGENTA RT355-D" manufactured by Ciba Speciality Chemicals Inc.) as a pigment, 18 parts of a polymer dispersant ("EFKA 4060" manufactured by EFKA Additives) as a pigment dispersant, 7.5 parts of methoxybutyl acetate and 100 parts of zirconia beads having a diameter of 0.3 mm were weighed and charged, and then dispersed using a paint conditioner for 2 hours.

To 10 parts of the dispersion thus obtained, 1.2 parts of "SOLBIN CL" (used in Example 2), 26.3 parts of methoxybutyl acetate and 12.5 parts of dipropylene glycol dimethyl ether were added, and the mixture was stirred using a magnetic stirrer for 60 minutes. Thereafter, the mixture was suction filtrated through a glass filter to obtain an oil-based pigmented ink composition H.

EXAMPLE 9

To 7.5 parts of the dispersion obtained in Example 3, 3 parts of "VYLON® UR8300" (used in Example 5), 37.4 parts of methoxybutyl acetate and 2.1 parts of cyclohexanone (flash point: 44° C., boiling point: 156° C.) were added, and the mixture was stirred using a magnetic stirrer for 60 minutes. Thereafter, the mixture was suction filtrated through a glass filter to obtain an oil-based pigmented ink composition I.

EXAMPLE 10

To 8.5 parts of the dispersion obtained in Example 4, 1 part of "SOLBIN CL" (used in Example 2), 15 parts of γ-butyrolactone, 15.5 parts of methoxybutyl acetate and 10 parts of dipropylene glycol dimethyl ether were added, and the mixture was stirred using a magnetic stirrer for 60 minutes. Thereafter, the mixture was suction filtrated through a glass filter to obtain an oil-based pigmented ink composition J.

EXAMPLE 11

To 8.5 parts of the dispersion obtained in Example 4, 3.8 parts of "VYLON® UR8300" (used in Example 5), 7.5 parts of N-ethyl-2-pyrrolidone, 15.2 parts of methoxybutyl acetate and 15 parts of dipropylene glycol monomethyl ether monomethyl ester were added, and the mixture was stirred using a magnetic stirrer for 30 minutes. Thereafter, the mixture was suction filtrated through a glass filter to obtain an oil-based pigmented ink composition K.

EXAMPLE 12

To 8.5 parts of the dispersion obtained in Example 4, 1.2 parts of "VYLON® 296" (weight average molecular weight: 14,000, manufactured by Toyobo Co., Ltd.), 5 parts of N-methyl-2-pyrrolidone, 26.1 parts of methoxybutyl acetate and 10 parts of propylene glycol dimethyl ester (manufactured by Dow Chemical Co., flash point: 93° C., boiling point: 190° C.) were added, and the mixture was stirred using a magnetic stirrer for 30 minutes. Thereafter, the mixture was suction filtrated through a glass filter to obtain an oil-based pigmented ink composition L.

COMPARATIVE EXAMPLE 1

Oil-Based Pigmented Ink Composition 1 Containing 3-methoxy-3-methyl-butyl Acetate as Primary Solvent In the same manner as in Example 1, except that the same amount of 3-methoxy-3-methyl-butyl acetate (manufactured by KURARAY CO., LTD., flash point: 75.5° C., boiling point: 188° C.) was used as an organic solvent in place of 6 parts of methoxybutyl acetate, the dispersion was carried out to obtain a dispersion.

To 7.5 parts of the dispersion thus obtained, 1.2 parts of "SOLBIN C5" (used in Example 1), 10 parts of N-methyl-2-pyrrolidone, 21.3 parts of 3-methoxy-3-methyl-butyl acetate and 10 parts of dipropylene glycol dimethyl ether were added, and the mixture was stirred using a magnetic stirrer for 60 minutes. Thereafter, the mixture was suction filtrated through a glass filter (manufactured by Kiriyama glass Co.) to obtain an oil-based pigmented ink composition M.

COMPARATIVE EXAMPLE 2

Oil-Based Pigmented Ink Composition 2 Containing 3-methoxy-3-methyl-butyl Acetate as Primary Solvent To 6.25 parts of the dispersion obtained in Comparative Example 1, 0.5 parts of a vinyl chloride-vinyl acetate copolymer resin "VAGH" (weight average molecular weight: 27,000 manufactured by The Dow Chemical Company), 1.25 parts of polyvinyl butyral resin ("DENKA BUTYRAL 2000L" manufactured by Denki Kagaku Kogyo Kabushiki Kaisha), 0.9 parts of an urethane-modified acryl resin ("THERMOLAC T-361" manufactured by Soken Chemical & Engineering Co., Ltd.), 7 parts of 3-methoxy-3-methyl-butyl acetate, 13.1 parts of butyl lactate (manufactured by Musashino Chemical Laboratory, Ltd., flash point: 75.5° C., boiling point: 186° C.), 7 parts of propylene glycol monomethyl ether acetate (manufactured by Dow Chemical Co., flash point: 46.5° C., boiling point: 146° C.), 7 parts of propylene glycol monomethyl ether (manufactured by Dow Chemical Co., flash point: 34.0° C., boiling point: 120° C.) and 7 parts of 3-methoxy-3-methyl-1-butanol (manufactured by KURARAY CO., LTD., flash point: 68° C., boiling point: 174° C.) were added, and the mixture was stirred using a magnetic stirrer for 60 minutes. Thereafter, the mixture was suction filtrated through a glass filter to obtain an oil-based pigmented ink composition N.

COMPARATIVE EXAMPLE 3

Oil-Based Pigmented Ink Composition 1 Containing Dipropylene Glycol Monomethyl Ether Monomethyl Ester as Primary Solvent In the same manner as in Example 1, except that the same amount of dipropylene glycol monomethyl ether monomethyl ester was used as an organic solvent in place of 6 parts of methoxybutyl acetate, the dispersion was carried out to obtain a dispersion.

To 7.5 parts of the dispersion thus obtained, 3 parts of "VYLON® UR8300" (used in Example 5) and 39.5 parts of dipropylene glycol monomethyl ether monomethyl ester were added, and the mixture was stirred using a magnetic stirrer for 60 minutes. Thereafter, the mixture was suction filtrated through a glass filter to obtain an oil-based pigmented ink composition O.

COMPARATIVE EXAMPLE 4

Oil-Based Pigmented Ink Composition 2 Containing Dipropylene Glycol Monomethyl Ether Monomethyl Ester as Primary Solvent To 7.5 parts of the dispersion obtained in Comparative Example 3, 1 part of "VYLON® UR8300" (used in Example 5) and 41.5 parts of dipropylene glycol monomethyl ether monomethyl ester were added, and the mixture was stirred using a magnetic stirrer for 60 minutes. Thereafter, the mixture was suction filtrated through a glass filter to obtain an oil-based pigmented ink composition P.

COMPARATIVE EXAMPLE 5

Oil-Based Pigmented Ink Composition Containing Diethylene Glycol Monobutylethermonomethylester as Primary Solvent In a 100 cc plastic bottle, 4 parts of acidic carbon black ("MA100" manufactured by Mitsubishi Chemical Corporation) as a pigment, 2.0 parts of an anionic surfactant ("HOMOGENOL L-95" manufactured by Kao Corporation) as a pigment dispersant, 14 parts of diethylene glycol monobutyl ether monomethyl ester (manufactured by KYOWA HAKKO KOGYO Co., Ltd., flash point: 124° C., boiling point: 247°

C.) and 100 parts of zirconia beads having a diameter of 0.3 mm were weighed and charged, and then dispersed using a paint conditioner for 2 hours.

To 16 parts of the dispersion thus obtained, 8 parts of nitrocellulose ("SL-1" manufactured by Asahi Kasei Corporation) and 26 parts of diethylene glycol monobutyl ether monomethyl ester were added, and the mixture was stirred using a magnetic stirrer for 30 minutes. Thereafter, the mixture was suction filtrated through a glass filter to obtain an oil-based pigmented ink composition Q.

COMPARATIVE EXAMPLE 6

Oil-Based Pigmented Ink Composition Containing Propylene Carbonate as Primary Solvent In the same manner as in Example 1, except that the same amount of propylene carbonate (flash point: 132° C., boiling point: 242° C.) was used as an organic solvent in place of 6 parts of methoxybutyl acetate, the dispersion was carried out to obtain a dispersion.

To 7.5 parts of the dispersion thus obtained, 1 part of "VYLON® UR8300" (used in Example 5) and 41.5 parts of propylene carbonate were added, and the mixture was stirred using a magnetic stirrer for 60 minutes. Thereafter, the mixture was suction filtrated through a glass filter to obtain an oil-based pigmented ink composition R.

COMPARATIVE EXAMPLE 7

Oil-Based Pigmented Ink Composition Containing Cyclohexanone as Primary Solvent

In the same manner as in Example 1, except that the same amount of cyclohexanone was used as an organic solvent in place of 6 parts of methoxybutyl acetate, the dispersion was carried out to obtain a dispersion.

To 7.5 parts of the dispersion thus obtained, 3 parts of "VYLON® UR8300" (used in Example 5) and 39.5 parts of cyclohexanone were added, and the mixture was stirred using a magnetic stirrer for 60 minutes. Thereafter, the mixture was suction filtrated through a glass filter to obtain an oil-based pigmented ink composition S.

COMPARATIVE EXAMPLE 8

Oil-Based Pigmented Ink Composition Containing N-methyl-2-pyrrolidone as Primary Solvent In the same manner as in Example 1, except that the same amount of N-methyl-2-pyrrolidone was used as an organic solvent in place of 6 parts of methoxybutyl acetate, the dispersion was carried out to obtain a dispersion.

To 7.5 parts of the dispersion thus obtained, 2 parts of "VYLON® UR8300" (used in Example 5) and 40.5 parts of N-methyl-2-pyrrolidone were added, and the mixture was stirred using a magnetic stirrer for 60 minutes. Thereafter, the mixture was suction filtrated through a glass filter to obtain an oil-based pigmented ink composition T.

With respect to oil-based pigmented ink compositions A to L of Examples 1 to 12 and oil-based pigmented ink compositions M to T of Comparative Examples 1 to 8, a viscosity, a surface tension, a dispersion average particle size and a flash point were measured by the following methods. The results are shown in Table 1.

In Table 1, with respect to the kind of each ink composition, for example, "oil-based pigmented ink composition A" was merely described as "ink composition A".

<Viscosity>

A viscosity of an ink composition was measured using a R100 viscometer (manufactured by TOKI SANGYO Co., Ltd.) at 25° C. and a cone rotation speed of 20 rpm.

<Surface Tension>

A surface tension of an ink composition was measured using a full-automatic balance type electrotensiometer ESB-V (manufactured by KYOWA SCIENCE Co., Ltd.) at an ink temperature of 25° C.

<Dispersion Average Particle Size>

A dispersion average particle size of pigment particles was measured using a particle size analyzer N4-PLUS (a laser Doppler particle size analyzer manufactured by Coulter). In the measurement, a solvent used in case of dispersing a pigment was used as a diluent solvent.

<Flash Point>

A flash point was measured by a SETA sealed flash point tester.

TABLE 1

| | Ink composition | Viscosity (cp) | Surface tension (mN/m) | Dispersion average particle size (nm) | Flash point (° C.) |
|---|---|---|---|---|---|
| Example 1 | Ink composition A | 3.8 | 29.5 | 113 | 64 |
| Example 2 | Ink composition B | 4.8 | 29.4 | 155 | 63 |
| Example 3 | Ink composition C | 4.4 | 29.7 | 148 | 73 |
| Example 4 | Ink composition D | 4.0 | 29.8 | 99 | 63 |
| Example 5 | Ink composition E | 4.9 | 29.4 | 115 | 66 |
| Example 6 | Ink composition F | 4.3 | 29.8 | 110 | 65 |
| Example 7 | Ink composition G | 3.6 | 30.3 | 113 | 63 |
| Example 8 | Ink composition H | 4.4 | 29.6 | 138 | 63 |
| Example 9 | Ink composition I | 4.7 | 30.2 | 148 | 62 |
| Example 10 | Ink composition J | 4.5 | 29.5 | 98 | 63 |
| Example 11 | Ink composition K | 4.3 | 29.6 | 99 | 66 |
| Example 12 | Ink composition L | 4.9 | 31.0 | 98 | 64 |
| Comparative Example 1 | Ink composition M | 6.8 | 29.0 | 113 | 74 |
| Comparative Example 2 | Ink composition N | 8.6 | 28.8 | 113 | 46 |
| Comparative Example 3 | Ink composition O | 7.2 | 29.2 | 116 | 97 |
| Comparative Example 4 | Ink composition P | 4.8 | 29.3 | 115 | 97 |
| Comparative Example 5 | Ink composition Q | 11.8 | 29.0 | 187 | 124 |
| Comparative Example 6 | Ink composition R | 8.5 | 39.8 | 208 | 132 |
| Comparative Example 7 | Ink composition S | 5.5 | 32.8 | 119 | 43 |
| Comparative Example 8 | Ink composition T | 5.8 | 38.9 | 176 | 92 |

With respect to oil-based pigmented ink compositions A to L of Examples 1 to 12 and oil-based pigmented ink compositions M to T of Comparative Examples 1 to 8, drying property, fixing property, alcohol resistance and ejection stability were evaluated by the following methods. The results are shown in Table 2.

In Table 2, with respect to the kind of each ink composition, for example, "oil-based pigmented ink composition A" was merely described as "ink composition A".

<Drying Property>

An ink composition was coated on a glossy PVC sheet (Controltac 180-10 manufactured by 3M) using a No. 6 wire bar (manufactured by TOYO SEIKI KOGYO Co., Ltd.) in a temperature-controlled room at 25° C. and 30% RH, and its drying property was evaluated according to the following criteria.

A: When the surface of the coated sheet is touched with a finger, the coated composition does not adhere to the finger within 2 minute drying.

B: When the surface of the coated sheet is touched with a finger, the coated composition does not adhere to the finger within 5 minutes drying.

C: When the surface of the coated sheet is touched with a finger, the coated composition does not adhere to the finger within 10 minutes drying.

D: When the surface of the coated sheet is touched with a finger, the coated composition still adheres to the finger even after 10 minutes drying.

<Fixing Property>

An ink composition was coated on a glossy PVC sheet (Controltac 180-10 manufactured by 3M) using a No. 6 wire bar (manufactured by TOYO SEIKI KOGYO Co., Ltd.) in a temperature-controlled room at 25° C. and 30% RH. After the coated PVC sheet was allowed to stand for 3 hours, the surface of the coated sheet was scrubbed with a finger for 30 seconds. Then, the fixing property was evaluated according to the following criteria.

A: No scrubbed mark was observed.

B: A small number of scrubbed marks were observed.

C: Scrubbed marks were generated and the substrate PVC sheet was exposed.

<Alcohol Resistance>

An ink composition was coated on a glossy PVC sheet (Controltac 180-10 manufactured by 3M) using a No. 6 wire bar (manufactured by TOYO SEIKI KOGYO Co., Ltd.) in a temperature-controlled room at 25° C. and 30% RH. After the coated PVC sheet was allowed to stand for 3 hours, the surface of the coated sheet was wiped with a piece of cloth (BENCOTTON Manufactured by ASAHI CHEMICAL Co., Ltd.) impregnated with a water/ethanol mixture (weight ratio of 1:1). Then, the alcohol resistance was evaluated according to the following criteria.

A: The surface of the coated sheet was not wiped off by wiping 50 round trip

B: When the surface of the coated sheet was wiped at least 30 round trip, an ink slightly adhered.

C: When the surface of the coated sheet was wiped within 30 round trip, an ink adhered.

D: The coated ink composition was easily wiped off and the substrate PVS sheet was exposed.

<Ejection Stability>

An ink-jet printer "MC-2000" manufactured by Seiko Epson Corporation was filled with an ink composition and solid printing measuring 20 cm in width×30 cm in length of a MC matte paper was carried out at a MC matte paper mode. Then, the ejection stability was evaluated according to the following criteria.

A: No dot blank was generated after solid printing.

B: Three or more dot blanks were generated after solid printing.

C: Five or more dot blanks were generated after solid printing.

D: An ink could not be ejected during solid printing, or an ink could nit be ejected from the beginning.

TABLE 2

|  | Ink composition | Dying property | Fixing property | Alcohol resistance | Ejection stability |
|---|---|---|---|---|---|
| Example 1 | Ink composition A | A | B | A | A |
| Example 2 | Ink composition B | A | B | A | A |
| Example 3 | Ink composition C | A | B | A | A |
| Example 4 | Ink composition D | A | B | A | A |
| Example 5 | Ink composition E | A | B | A | A |
| Example 6 | Ink composition F | A | B | B | A |
| Example 7 | Ink composition G | A | B | B | B |
| Example 8 | Ink composition H | B | B | B | B |
| Example 9 | Ink composition I | B | B | B | B |
| Example 10 | Ink composition J | A | B | B | A |
| Example 11 | Ink composition K | A | B | A | A |
| Example 12 | Ink composition L | A | B | A | A |
| Comparative Example 1 | Ink composition M | B | B | A | D |
| Comparative Example 2 | Ink composition N | B | C | C | D |
| Comparative Example 3 | Ink composition O | C | B | C | D |
| Comparative Example 4 | Ink composition P | C | C | D | B |
| Comparative Example 5 | Ink composition Q | D | C | D | D |
| Comparative Example 6 | Ink composition R | D | D | D | D |
| Comparative Example 7 | Ink composition S | A | B | A | C |
| Comparative Example 8 | Ink composition T | D | B | A | C |

As is apparent from the results shown in Table 1, all of oil-based pigmented ink compositions A to L of Examples 1 to 12 have proper viscosity, surface tension and dispersion average particle size, and also have a flash point of 61° C. or higher and therefore it is possible to handle these oil-based pigmented ink compositions comparatively safely.

To the contrary, oil-based pigmented ink compositions N and S of Comparative Example 2 and 7 have a flash point of lower than 61° C. and thus a special attention must be paid in case of handling and also their storage and transportation are restricted.

As is apparent from the results shown in Table 2, oil-based pigmented ink compositions A to L of Examples 1 to 12 showed excellent drying property, fixing property and alcohol resistance and caused no problem with respect to ejection stability in case of printing using a printer, and these oil-based pigmented ink compositions were excellent in all evaluation items.

In particular, oil-based pigmented ink compositions A to G and J to L of Examples 1 to 7 and 10 to 12 contain a heterocyclic compound having a property capable of dissolving PVC and therefore fixed rapidly to a PVC sheet and also showed excellent drying property. Also, oil-based pigmented ink compositions A to E, K and L of Examples 1 to 5, 11 and 12 contain a nitrogen-containing heterocyclic compound having excellent property capable of dissolving PVC and showed particularly excellent alcohol resistance. Furthermore, oil-based pigmented ink compositions A to F and J to L of Examples 1 to 6 and 10 to 12 contain both a heterocyclic compound and a (poly)alkylene glycol derivative and were particularly excellent in ejection stability.

To the contrary, all of oil-based pigmented ink compositions M to T of Comparative Examples 1 to 8 showed high viscosity and caused ejection failure in case of printing using a printer, excluding the oil-based pigmented ink composition P of Comparative Example 4. Also, the oil-based pigmented ink composition P of Comparative Example 4 was inferior in fixing property and alcohol resistance because an amount of a resin was adjusted to a small amount so as to achieve low viscosity.

Furthermore, the oil-based pigmented ink compositions O to R of Comparative Examples 3 to 6 and the oil-based pigmented ink composition T of Comparative Example 8 were inferior in drying property in case of printing on a nonabsorptive PVC sheet because a solvent having comparatively high boiling point is used as a primary solvent.

The invention claimed is:

1. An oil-based pigmented ink composition for ink-jet recording system comprising at least a pigment, a polymer compound and an organic solvent, which contains, as the organic solvent, methoxybutyl acetate in an amount of 20 to 90% by weight as well as a nitrogen-containing and/or oxygen-containing heterocyclic compound in an amount of 1 to 50% by weight, based on the entire ink composition.

2. The oil-based pigmented ink composition according to claim 1, which further contains, as the organic solvent, a (poly)alkylene glycol derivative in an amount of 1 to 50% by weight based on the entire ink composition.

3. The oil-based pigmented ink composition according to claim 2, wherein the (poly)alkylene glycol derivative is at least one compound selected from the group consisting of monoalkyl ether monoalkyl ester compounds, dialkyl ether compounds and dialkyl ester compounds of (poly)alkylene glycols.

4. The oil-based pigmented ink composition according to claim 1, which has a flash point of 61° C. or higher, a viscosity of 2.0 to 6.5 cp at 25° C., and a surface tension of 20 to 40 mN/m at 25° C.

5. The oil-based pigmented ink composition according to claim 4, which further contains, as the organic solvent, a (poly)alkylene glycol derivative in an amount of 1 to 50% by weight based on the entire ink composition.

6. The oil-based pigmented ink composition according to claim 5, wherein the (poly)alkylene glycol derivative is at least one compound selected from the group consisting of monoalkyl ether monoalkyl ester compounds, dialkyl ether compounds and dialkyl ester compounds of (poly)alkylene glycols.

7. The oil-based pigmented ink composition according to claim 4, which has a viscosity of 3.0 to 6.0 cp at 25° C.

8. The oil-based pigmented ink composition according to claim 4, which has a viscosity of 3.5 to 5.5 cp at 25° C.

9. The oil-based pigmented ink composition according to claim 5, which has a viscosity of 3.0 to 6.0 cp at 25° C.

10. The oil-based pigmented ink composition according to claim 5, which has a viscosity of 3.5 to 5.5 cp at 25° C.

11. The oil-based pigmented ink composition according to claim 6, which has a viscosity of 3.0 to 6.0 cp at 25° C.

12. The oil-based pigmented ink composition according to claim 6, which has a viscosity of 3.5 to 5.5 cp at 25° C.

13. The oil-based pigmented ink composition for ink-jet recording system according to claim 1, wherein the nitrogen-containing heterocyclic compound has a lactam structure and the oxygen-containing heterocyclic compound has a lactone structure.

* * * * *